United States Patent [19]
Saito et al.

[11] Patent Number: 5,473,482
[45] Date of Patent: Dec. 5, 1995

[54] MAGNETIC DISK APPARATUS AND METHOD WITH ACTUATOR CONTROL USING SERVO SECTOR INFORMATION READ OUT AT PARTICULAR TIMINGS

[75] Inventors: Kazuhiko Saito, Ibaragi; Toshiyuki Okawa, Tokyo, both of Japan

[73] Assignee: NEC Corporation, Tokyo, Japan

[21] Appl. No.: 136,231

[22] Filed: Oct. 15, 1993

[30] Foreign Application Priority Data

Oct. 16, 1992 [JP] Japan ................. 4-278225

[51] Int. Cl.[6] ................................ G11B 5/596
[52] U.S. Cl. .................... 360/77.08; 360/78.07; 360/77.06
[58] Field of Search ............. 360/77.08, 77.02, 360/77.06, 78.07, 78.04, 78.09; 369/44.26

[56] References Cited

U.S. PATENT DOCUMENTS

| | | | |
|---|---|---|---|
| 4,679,103 | 7/1987 | Workman | 360/77.08 |
| 4,835,632 | 5/1989 | Shih et al. | 360/78.04 |
| 4,910,616 | 3/1990 | Sirai et al. | 360/77.08 |
| 5,153,788 | 10/1992 | Nishikawa et al. | 360/77.08 |
| 5,295,026 | 3/1994 | Chishima | 360/77.08 |
| 5,381,282 | 1/1995 | Arai et al. | 330/78.07 |

OTHER PUBLICATIONS

"Digital Control of Dynamic Systems—2nd ed." authored by G. Franklin et al, pub. Addison–Wesley Publishing Co., Inc. (1990), pp. 250–265.

*Primary Examiner*—Aristotelis Psitos
*Assistant Examiner*—Varsha A. Kapadia
*Attorney, Agent, or Firm*—Sughrue, Mion, Zinn, Macpeak & Seas

[57] ABSTRACT

A magnetic disc apparatus controls the output timing of control current data by use of a servo estimation type observer. Servo information is read from a servo sector of a magnetic disc, decoded, and used to calculate control current data. Before the servo information of the following servo sector is fully decoded, the calculated control current data from the previously read servo sector is output, converted to a current, and sent to the actuator of a magnetic head.

5 Claims, 3 Drawing Sheets

MAGNETIC DISK APPARATUS AND METHOD WITH ACTUATOR CONTROL USING SERVO SECTOR INFORMATION READ OUT AT PARTICULAR TIMINGS

BACKGROUND OF THE INVENTION

The present invention relates to a magnetic disk apparatus applicable to, for example, data processing equipment and implemented by a sector servo system. More particularly, the present invention is concerned with a magnetic disk apparatus capable of controlling the output timing of control current data by use of a servo estimation type observer.

A magnetic disk apparatus of the type described is disclosed in, for example, "Digital Control of Dynamic Systems— 2nd ed." authored by Gene F. Franklin, J. David Powell and Micheal L. Workman and published by Addison-Wesley Publishing Company, Inc. (1990). This document teaches a closed-loop estimator made up of a plant system and an observer system. A magnetic disk apparatus implemented with such an estimator decodes servo information read out of a servo sector at a time t, converts control data calculated by an observer by using an equation (1), which is shown below, to an analog control current output by a digital-to-analog (D/A) converter, and then feeds the control current output to an actuator included in a positioning mechanism at a time t+1.

$$X(k+1)=\Phi X(k)+\Gamma u(k)+Lp[y(k)-HX(k)] \quad (1)$$

Specifically, it has been customary with a magnetic disk apparatus to decode servo information read out of a given servo sector, calculate control current data meant for the next sector by a servo estimation type observer the based on the equation (1), convert the calculated data to analog control current output by a D/A converter, and then feed the control current output to an actuator after servo information read out of the next servo sector has been decoded (see FIG. 4).

The problem with such a conventional magnetic disk apparatus is as follows. Since servo information are sequentially recorded at constant intervals in the recording surface of a magnetic disk medium, the sampling interval is too broad to secure a sufficient phase margin in relation to a frequency characteristic particular to the positioning mechanism. As a result, the operation of the positioning mechanism is not stable.

SUMMARY OF THE INVENTION

It is, therefore, an object of the present invention to provide a magnetic disk apparatus which insures a sufficient phase margin in relation to the frequency characteristic of a positioning mechanism and promotes stable operation of the positioning mechanism.

A magnetic disk apparatus of the present invention comprises at least one magnetic recording medium having a plurality of servo sectors each storing servo information, at least one magnetic head for selectively writing or reading data in or out of the recording surface of the recording medium, an actuator for moving the head to a designated cylinder position over the recording medium, and a position control circuit for calculating control current data on the basis of the servo information read out of one of the plurality of servo sectors, holding the control current data for a predetermined period of time, outputting the control current data before the servo information of the next servo sector is fully decoded, and then feeding a control current corresponding to the control current data to the actuator.

BRIEF DESCRIPTION OF THE DRAWINGS

The features and advantages of the present invention will become apparent from the following description when taken in conjunction with the accompanying drawings in which.

In the figures, the same or similar constituent parts are designated by like reference numerals.

DETAILED DESCRIPTION OF THE PREFERRED EMBODIMENTS

Figure 1:
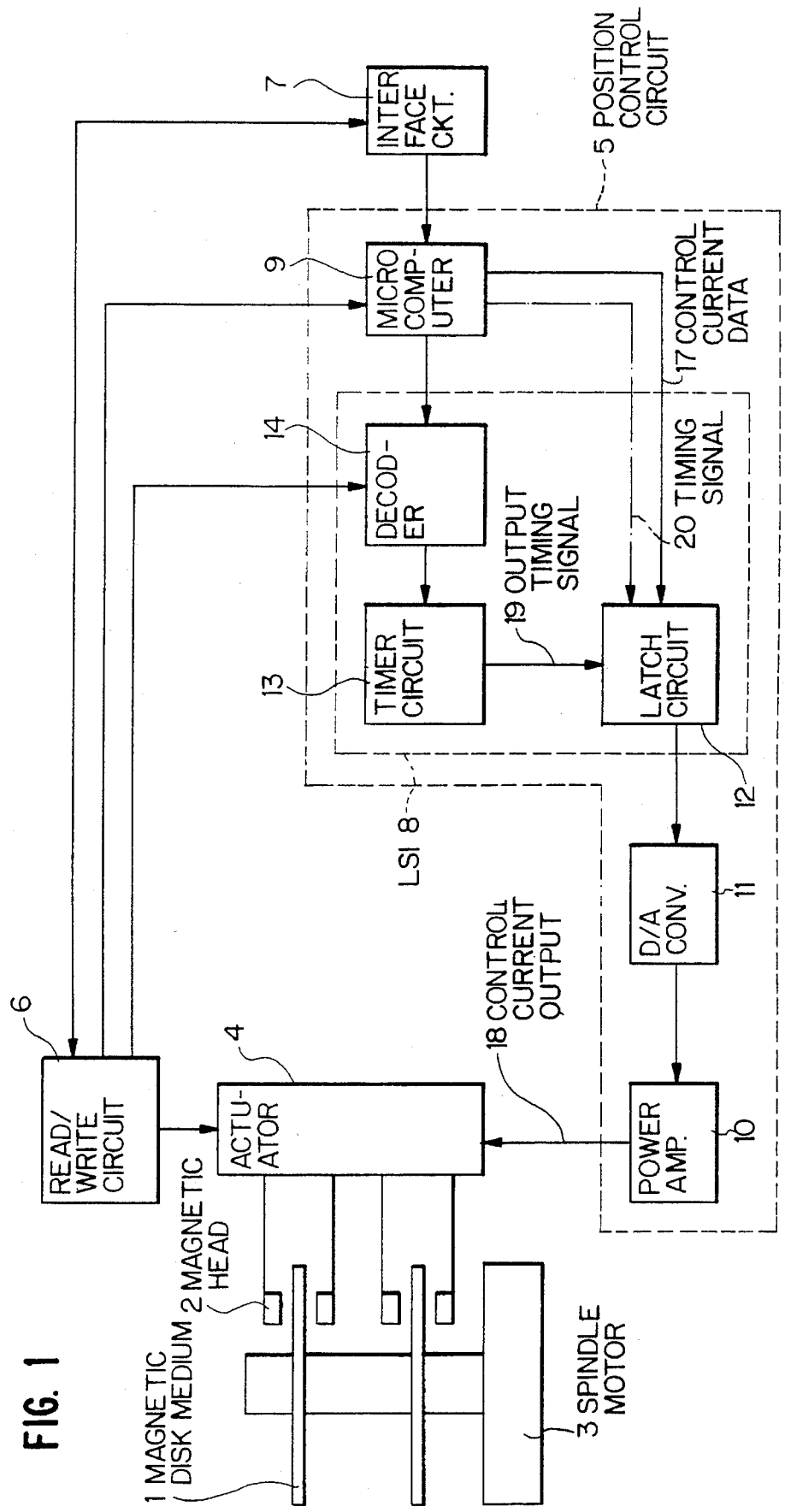
FIG. 1 is a block diagram schematically showing a first and a second embodiment of the magnetic disk apparatus in accordance with the present invention.

Referring to FIG. 1 of the drawings, a magnetic disk apparatus embodying the present invention will be described. As shown the apparatus includes at least one magnetic disk medium 1 and at least one magnetic head 2. The head 2 selectively writes or reads data in or out of the recording surface of the disk medium, or simply disk as referred to hereinafter, 1. A spindle motor 3 causes the disk 1 loaded thereon to spin. An actuator 4 moves the head 2 to a predetermined position over the recording surface of the disk 1 by being driven by a position control circuit 5. A read/write circuit 6 causes the head 2 to write or read data in or out of the disk 1. An interface circuit 7 interfaces the magnetic disk apparatus to data processing equipment or similar host, not shown. Specifically, data read out of the disk 1 by the head 2 or data to be written in the disk 1 by the head 2 is transferred to or from the host via the interface circuit 7.

The position control circuit 5 is generally made up of a microcomputer 9 storing a program, an LSI (Large Scale Integrated circuit) 8, a digital-to-analog (D/A) converter 11, and a power amplifier 10. The microcomputer 9 calculates control current data 17 on the basis of servo information which is read out of a servo sector provided in the disk 1. The LSI 8 holds the control current data as instructed by the microcomputer 9 and, on the elapse of a predetermined period of time, outputs it. The D/A converter 11 transforms the control current data fed from the LSI 8 to analog data and outputs the analog data as a control current. The power amplifier 10 amplifies the control current and delivers the resulting control current output 18 to the actuator 4. On receiving the control current output 18, the actuator 4 moves the head 2 to a predetermined cylinder position over the recording surface of the disk 1 which is spinning on the spindle motor 3, as stated earlier.

The LSI 8 has a decoder 14 for decoding servo information sent from the read/write circuit 6. A timer circuit 13 counts time in response to a command from the decoder 14. A latch circuit 12 holds the control current data 17 received from the microcomputer 9 and outputs it in response to an output timing signal 19 fed from the timer circuit 13. When the decoder 14 has fully decoded the servo information of a servo sector 15, FIG. 2, it delivers an end-of-decode signal to the timer circuit 13. In response, the timer circuit 13 starts counting time. The latch circuit 12 latches the control current data 17 fed from the microcomputer 9 and, on receiving an output timing signal 19 from the timer circuit 19, delivers it to the D/A converter 11.

Figure 2:
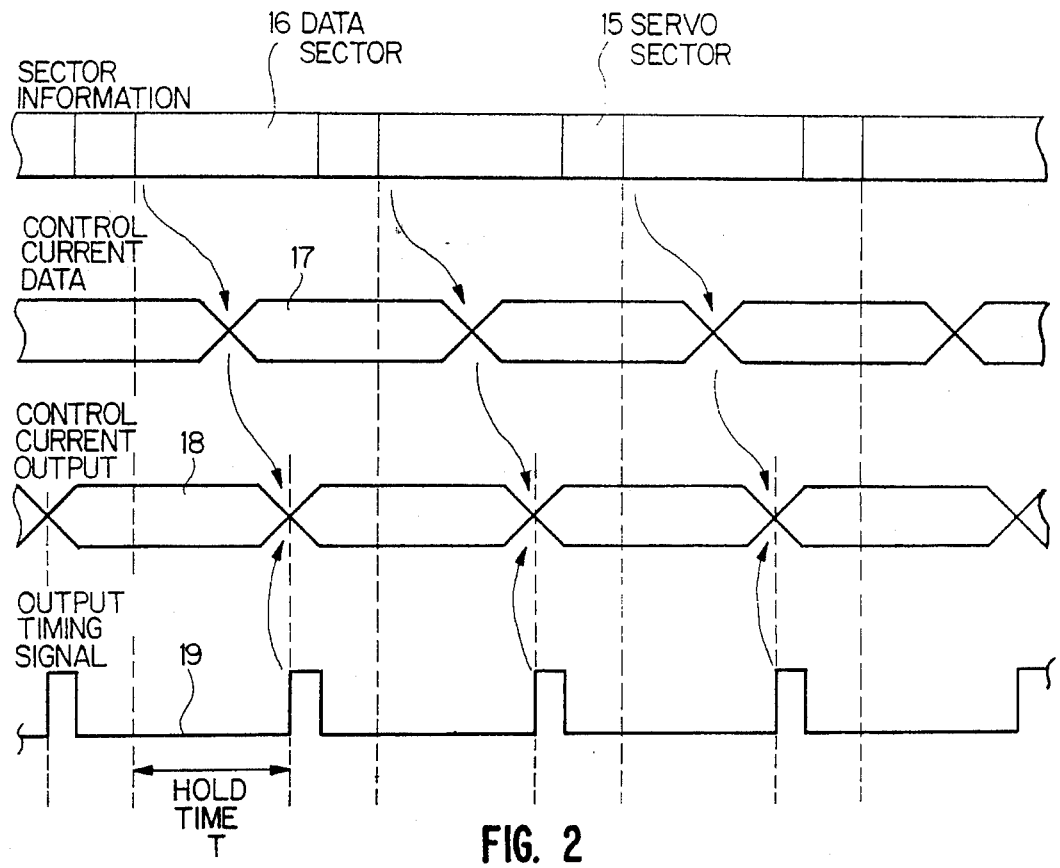
FIG. 2 is a timing chart demonstrating a specific operation of the first embodiment.
Figure 4:
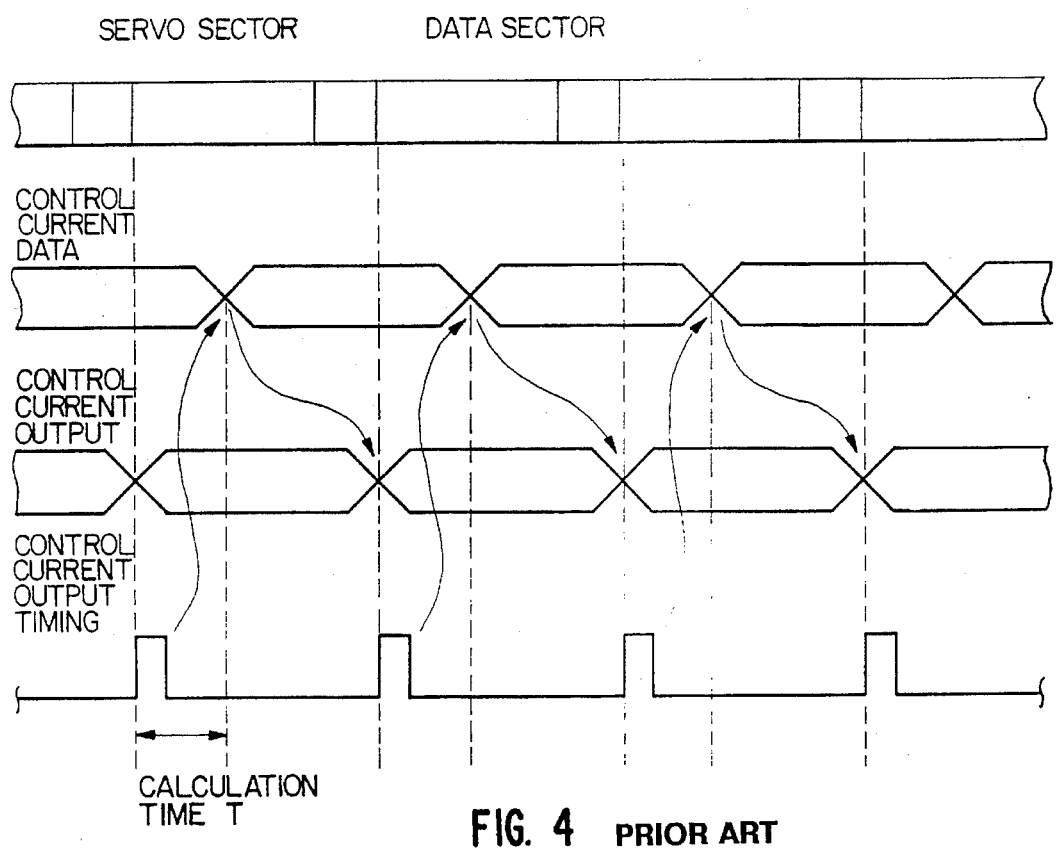
FIG. 4 is a timing chart showing the operation of a conventional magnetic disk apparatus.

FIG. 2 is a timing chart representative of a specific operation of the illustrative embodiment. As shown, the servo sector 15 stores servo information, e.g., the current position of the head 2 or the displacement of the head 2 as measured from the center of a track. A data sector 16 is assigned to data to be written in or read out of the disk 1. The control current data 17 is calculated by the microcomputer 9 on the basis of the servo information read out of the servo sector 15, and it is meant for the next servo sector 15. The control current output 18 is used to drive the actuator 4. Specifically, as the LSI 8 outputs control current data on the elapse of a predetermined period of time, the data is converted to analog data by the D/A converter 11 and then amplified by the power amplifier 10. Therefore, the control current output 18 is the amplified output of the power amplifier 10.

The operation of the embodiment will be described with reference to FIGS. 1 and 2. Servo information read out of the servo sector 15 by the head 2 and read/write circuit 6 is sent to the decoder 14 of the LSI 8. At the same time, the microcomputer 9 calculates control current data on the basis of the received servo information and delivers the control current data 17 to the latch circuit 12. The latch circuit 12 latches the control current data 17. As the decoder 14 feeds the previously mentioned end-of-decode signal to the timer circuit 13, the timer circuit 13 starts counting time. After the reception of the end-of-decode signal, the timer circuit 13 produces an output timing signal 19 on the elapse of a predetermined period of time T before the servo information of the next servo sector 15 is decoded. In response to the output timing signal 19, the latch circuit 12 delivers the control current data to the D/A converter 11. The D/A converter 11 converts the received control current data to analog data and feeds the analog data to the power amplifier 10. The power amplifier 10 amplifies the input control current data and applies the resulting control current output 18 to the actuator 4.

As stated above, in the illustrative embodiment, the timer circuit 13 included in the LSI 8 starts counting time in response to an end-of-decode signal which indicates that a servo sector 15 provided in the recording surface of the disk 1 has been fully decoded. On the elapse of a predetermined period of time, and before the servo information of the next servo sector 15 is fully decoded, control current data is output. Hence, a sufficient phase margin is guaranteed in relation to a frequency characteristic particular to the positioning mechanism of the apparatus. In addition, the positioning mechanism is operable with enhanced stability.

An alternative embodiment of the present invention will be described with reference to FIGS. 1 and 3. This embodiment uses, in determining the timing for causing the latch circuit 12 to output control current data, a software timer implemented by a software program stored in the microcomputer 9, in place of the timer circuit 13 built in the LSI 8.

Figure 3:
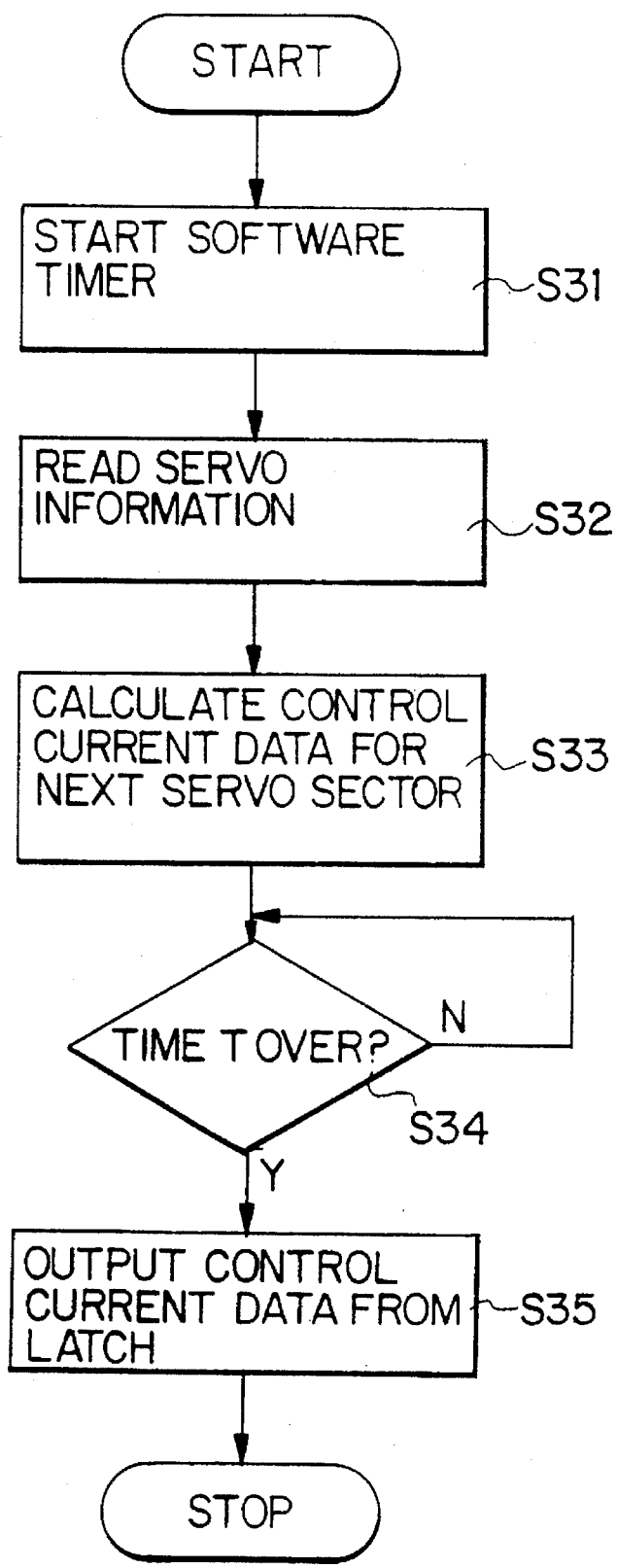
FIG. 3 is a flowchart representative of a specific operation of the second embodiment.

FIG. 3 is a flowchart demonstrating a specific operation of this embodiment. The servo information read out of the servo sector 15 of the disk 1 is applied to the microcomputer 9. In response, the microcomputer 9 starts calculating control current data based on the servo information and, at the same time, starts up a software timer by a software program stored therein (step S31, FIG. 3). Subsequently, the microcomputer 9 reads the servo information decoded by the decoder 14 of the LSI 8 (step S32), calculates control current data 17 for the next servo sector 15, and then delivers the data 17 to the latch circuit 12 of the LSI 8 (step S33). The latch circuit 12 latches the control data 17. Then, the microcomputer 9 determines if a predetermined period of time has elapsed or not after the start-up of the software timer thereof (step S34). If the period of time T has elapsed, the microcomputer 9 generates a timing signal 20 for causing the latch circuit 12 to output the control current data 17. On receiving the timing signal 20, the latch circuit 12 delivers the control current data 17 to the D/A converter 11 (step S35). The D/A converter 11 transforms the control current data 17 to analog data and then applies it to the power amplifier 10. The power amplifier 10 amplifies the analog control current data 17 and feeds the amplified data to the actuator 4 as a control current output 18.

As described above, in the alternative embodiment, a software timer is built into the microcomputer 9 and implemented by a software program. The software timer determines whether or not a predetermined period of time T has elapsed after the reception of the servo information of a servo sector 15. After the period of time T has elapsed and before the servo information of the next servo sector 15 is fully decoded, control current data is output. This is also successful in securing a sufficient phase margin in relation to a frequency characteristic particular to the positioning mechanism of the magnetic disk apparatus. In addition, the positioning mechanism is operable with enhanced stability.

While the present invention has been described in conjunction with the preferred embodiments thereof, it will now be readily possible for those skilled in the art to put this invention into practice in various other manners.

What is claimed is:

1. A magnetic disk apparatus comprising:
    at least one magnetic recording medium having a plurality of sectors, each of said plurality of sectors having a servo sector storing servo information;
    at least one magnetic head for writing or reading data in or out of said magnetic recording medium;
    an actuator for moving said magnetic head to a designated cylinder position over said magnetic recording medium; and
    position control means for estimating control current for a second sector of said plurality of sectors on the basis of the servo information of the servo sector of a first sector of said plurality of sectors, and for feeding said control current to said actuator before the servo information of the servo sector of said second sector is fully decoded;
    wherein said position control means comprises:
        estimating means for estimating control current data for said second sector on the basis of the servo information of the servo sector of said first sector;
        holding means for holding said control current data received from said estimating means for a predetermined period of time, and outputting said control current data before the servo information of the servo sector of said second sector is fully decoded;
        converting means for receiving said control current data from said holding means and converting said control current data to a corresponding control current; and
        amplifying means for amplifying said control current output from said converting means and feeding the amplified control current to said actuator; and
    wherein said holding means comprises:

decoding means for decoding the servo information read out of the servo sector of said first sector, and outputting an end-of-decode signal when said servo information is fully decoded;

time counting means started up by said end-of-decode signal for outputting a timing signal indicative of an elapse of said predetermined period of time; and latching means for holding said control current data received from said estimating means, and outputting said control current data in response to said timing signal and before the servo information of the servo sector of said second sector is full decoded.

2. A magnetic disk apparatus comprising:

at least one magnetic recording medium having a plurality of sectors, each of said plurality of sectors having a servo sector storing servo information;

at least one magnetic head for writing or reading data in or out of said magnetic recording medium;

an actuator for moving said magnetic head to a designated cylinder position over said magnetic recording medium; and position control means for estimating control current for a second sector of said plurality of sectors on the basis of the servo information of the servo sector of a first sector of said plurality of sectors, and for feeding said control current to said actuator before the servo information of the servo sector of said second sector is fully decoded;

wherein said position control means comprises:

calculating means for starting estimation of control current data for said second sector on the basis of the servo information of the servo sector of said first sector, and at the same time starting up a software timer incorporated in said calculating means;

holding means for decoding the servo information, holding said control current data received from said calculating means until said software timer indicates that a predetermined time has elapsed, and outputting said control current data before the servo information of the servo sector of said second sector is fully decoded;

converting means for receiving said control current data from said holding means and converting said control current data to a corresponding control current; and amplifying means for amplifying said control current output from said converting means and feeding the amplified control current to said actuator.

3. An apparatus as claimed in claim 2, wherein said means for holding said holding means comprises latching control current data received from said calculating means, and outputting, in response to a timing signal generated by said software timer and indicative of an elapse of said predetermined period of time, said control current data before the servo information of the next servo sector of said second sector is fully decoded.

4. A magnetic disk apparatus comprising:

at least one magnetic head;

at least one magnetic recording medium having a plurality of sectors, each of said plurality of sectors having a servo sector storing servo information;

an actuator for moving the magnetic head into position over the magnetic recording medium;

a read/write circuit for reading the servo information from the servo sectors of said plurality of servo sectors;

a decoder for decoding the servo information from the servo sectors of said plurality of servo sectors; and a position controlling circuit for calculating control current data in response to the servo information read from the servo sector of a first sector of said plurality of sectors and outputting the calculated control current data before the servo information from the servo sector of the second sector is fully decoded;

wherein said position controlling circuit further comprises a power amplifier responsive to control current data and connected to said actuator for producing a control current corresponding to said control current data and guiding that control current to said actuator; and wherein said position controlling circuit further comprises:

a latch circuit for receiving and holding control current data; and a timer circuit for releasing control current data from said latch circuit after a predetermined period of time and thereafter feeding the control current data to said power amplifier.

5. The magnetic disk apparatus of claim 4, wherein said timer circuit comprises a software clock.

* * * * *

UNITED STATES PATENT AND TRADEMARK OFFICE
CERTIFICATE OF CORRECTION

PATENT NO. : 5,473,482
DATED : December 5, 1995
INVENTOR(S) : Kazuhiko SAITO, Toshiyuki OKAWA It is certified that error appears in the above-indentified patent and that said Letters Patent is hereby corrected as shown below:

Col. 6, lines 5 and 6, delete "means for holding said holding means comprises latching", insert --holding means comprises latching means for holding said--.

Signed and Sealed this

Eleventh Day of June, 1996

Attest:

BRUCE LEHMAN

*Attesting Officer*   *Commissioner of Patents and Trademarks*